United States Patent [19]

Porcher

[11] Patent Number: 4,535,557
[45] Date of Patent: Aug. 20, 1985

[54] LABEL FOR THE IDENTIFICATION OF OBJECTS AND APPARATUS FOR USING SAID LABEL

[75] Inventor: Alain Porcher, Vitre, France

[73] Assignee: Societe Nouvelle Rockall France S.A., Vitre, France

[21] Appl. No.: 351,366

[22] Filed: Feb. 23, 1982

[30] Foreign Application Priority Data

Oct. 7, 1981 [FR] France .................................. 81 18862

[51] Int. Cl.³ ............................................. G09F 3/00
[52] U.S. Cl. ...................................... 40/300; 40/2 R; 40/301; 235/380; 235/487; 235/492
[58] Field of Search ......................... 40/300, 301, 2 R; 119/51 R; 235/472, 441, 488, 492, 380, 487; 339/65

[56] References Cited

U.S. PATENT DOCUMENTS

| | | | |
|---|---|---|---|
| 3,621,206 | 11/1971 | Scribner | 235/472 |
| 3,786,391 | 1/1974 | Mathauser | 339/65 |
| 3,952,438 | 4/1976 | Propst et al. | 40/300 |
| 4,004,133 | 1/1977 | Hannan et al. | 235/487 |
| 4,021,952 | 5/1977 | Brierly | 40/301 |
| 4,288,856 | 9/1981 | Linseth | 119/51 R |
| 4,417,413 | 11/1983 | Hopp et al. | 40/630 |

OTHER PUBLICATIONS

Dillon, B. C.; *IBM Technical Disclosure Bulletin*, vol. 20, No. 11B, Apr. 1978, pp. 4679 & 4680, "Electronic Identification Method".

*Primary Examiner*—Robert P. Swiatek
*Assistant Examiner*—Cary E. Stone
*Attorney, Agent, or Firm*—Wenderoth, Lind & Ponack

[57] ABSTRACT

A label comprises a region in which are marked with intelligible items of information. Another region includes a semi-conductor circuit in which are stored data relating to the object to be identified. A device for putting the semi-conductor circuit in communication with a device of utilization includes a glove, a finger of which glove is provided with a device for establishing contact with the semi-conductor circuit.

3 Claims, 3 Drawing Figures

LABEL FOR THE IDENTIFICATION OF OBJECTS AND APPARATUS FOR USING SAID LABEL

BACKGROUND OF THE INVENTION

The present invention relates to a label for the identification of an object, in particular an ear clip for marking cattle, of the type comprising a support element for carrying information and means for attaching said element to the object to be identified, the support element having an information region adapted to receive intelligible data on the object and a region for carrying items of information which are not intelligible directly by unauthorized persons.

Labels of this type are known in which the unintellible information carrying region is adapted to receive data in various forms. For example, some labels have an edge which is specially profiled by notches of different depths to which a particular value is assigned. Such a label is prepared and read by means of special apparatus available to authorized persons who, when it concerns the identification of cattle, may be the veterinary services. Other labels are provided with apertures disposed in accordance with a given network in the manner of perforated cards. Other labels comprise magnetic tracks on which the items of information are recorded.

Prior labels have the drawbacks of being limited with respect to the amount of the information it is possible to record thereon and the possibilities of processing the received information. Particularly in the case of cattle, it is often desirable to obtain easily and rapidly knowledge of a large number of data concerning an animal, such as, for example, its age, its origin, its breed, its veterinary antecedents, the medicines administered, and the food diet to which it has been subjected, etc.

SUMMARY OF THE INVENTION

An object of the invention is to provide a label which permits the recording and the rapid retrieval of all kinds of information concerning the object to be identified.

For this purpose, the invention provides a label of the type defined hereinbefore, wherein, in said unintelligible information carrying region, the label comprises electronic means for processing the information in the form of a semi-conductor circuit permitting the storage and the reading of data relating to the object.

With this label, there is a considerable flexibility achieved in the possibilities of identification, by the use of modern technics for processing information, in particular by a computer.

Another object of the invention is to provide an apparatus for the identification of a large number of objects by means of labels of the type defined hereinbefore, said apparatus comprising a portable device for communicating with said electronic means for processing the information and a device for utilizing the information recorded on said labels.

BRIEF DESCRIPTION OF THE DRAWINGS

A better understanding of the invention will be had from the ensuing description of two embodiments of the invention which are given merely by way of example with reference to the accompanying drawings, in which.

DETAILED DESCRIPTION OF THE INVENTION

Figure 1:
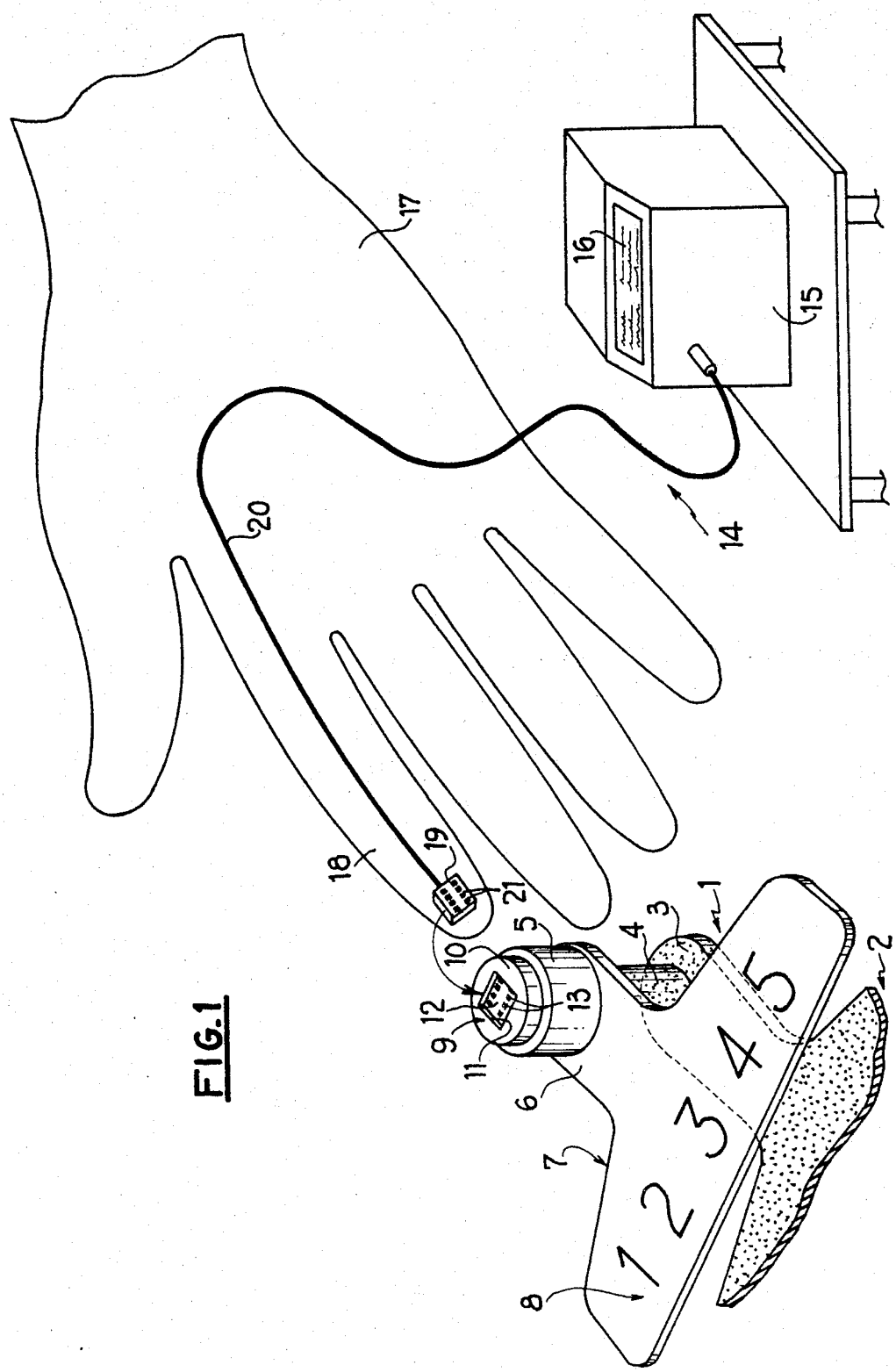
FIG. 1 is a diagrammatic perspective view of a label according to the invention and of the apparatus utilizing this label.

FIG. 1 shows diagrammatically a first embodiment of the invention in which a label 1, which is in fact an ear clip, is more particularly intended for the identification of an animal. The ear clip illustrated by way of example is that described in the French patent application No. 80 16663 filed on July 29, 1980 by the firm SOCIETE NOUVELLE ROCKALL FRANCE S.A. Consequently, the parts of the label not directly concerned in the present invention will not be described in detail.

This ear clip comprises a plate 2 provided with a tab 3 which is in one piece with a male element 4 of a fixing device comprising a female element 5 which is in one piece with a tab 6 of a second plate 7 of the ear clip. The second plate has a region 8 for intelligible identification and in which is inscribed a number, for example identifying the object for the user, or more precisely the animal for the breeder. When the ear clip is placed in position, a part of the ear of the animal is clamped between the plates 2 and 7.

The label has another region 9 for the identification of the animal which is not directly intelligible to the user. As can be seen, the female element 5 of the fixing device for the label is in the form of a hollow cylindrical spigot 5 which is closed at its free end by a relatively thick end wall 10. In this end wall is formed a cavity 11 of rectangular shape and adapted to constitute a housing for a semi-conductor circuit 12. The latter may be an integrated circuit and its electronic function may be that of a permanent memory or a random access-memory or a complete microprocessor. It is provided with contact studs 13 for the transfer of data signals. By way of an example, there may be employed for the integrated circuit 12 the following type: a programmable memory having fusible elements deposited on a substrate, manufactured for example by the firm SOREP 35220 CHATEAUBOURG.

The label or ear clip just described is advantageously employed with an apparatus 14, a diagrammatic illustration of which is given in FIG. 1. This apparatus comprises an information processing device 15 preferably constructed in the form of a movable unit and provided with a display screen 16 on which items of information which are normally not accessible to the user may be displayed. Of course, any other information processing device may be suitable. A keyboard for inserting the data (not shown) may also be provided.

This processing device 15 may be connected to the integrated circuit 12 of the label by communication means which, in the present embodiment, comprise a glove 17 whose index finger 18 is provided at its free end with a contact means 19 connected by a cable 20 to the information processing device 15.

The contact means 19 comprises contact studs 21 the number and arrangement of which correspond to those of the semi-conductor circuit 12. Its dimensions are adapted to those of the cavity 11 so that it may be easily inserted and positioned therein in order to achieve communication between the integrated circuit 12 and the information processing device 15. Further, this contact means may itself be provided with an electronic circuit (amplifier, impedance matcher, registers, etc. . . . ) for the purpose of facilitating the transfer of the data. Note that the circulation of the data may be ensured in both directions between the integrated circuit 12 and the information processing device 15.

The data may be introduced in the integrated circuit 12 or extracted therefrom by the application of the contact 19 on the integrated circuit 12. It will be understood that this operation presents no problem since it is sufficient to pinch the spigot 5 between the thumb and the index finger by means of the glove 17.

Figures 2, 3:
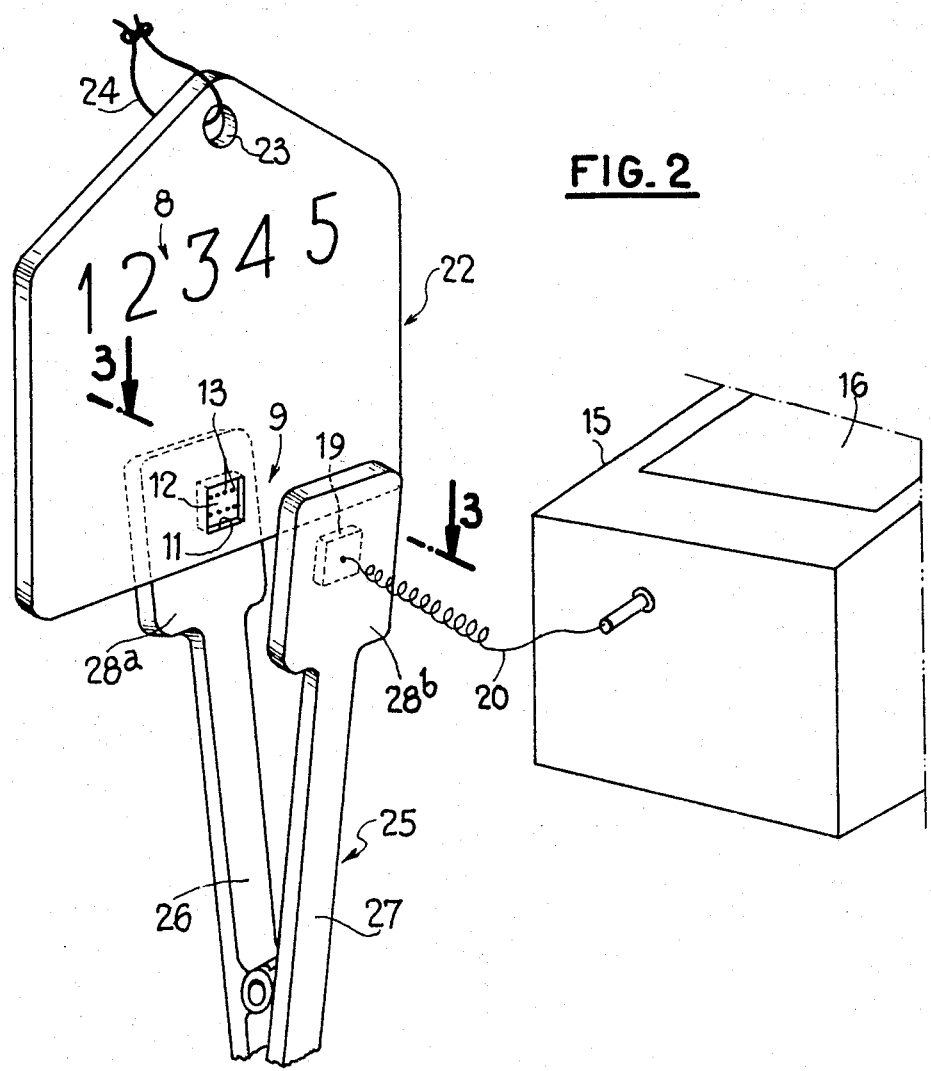
FIG. 2 is a diagrammatic perspective view of another embodiment of the invention.
FIG. 3 is a partial sectional view taken on line 3—3 of FIG. 2.

FIGS. 2 and 3 show another embodiment of the invention, in which the label is a single plate 22 provided with an aperture 23 for the passage of a tie. This label, which may be consequently easily attached to any object, has a region 8 for the intelligible identification and a region 9 for the identification by means of items of information which are not directly intelligible. In the second region 9, a cavity 11 is formed in which the integrated circuit 12 is disposed.

In this case, the communication means comprise a tool in the form of a tongs 25 having branches 26 and 27 at the end of which are provided tabs 28a and 28b. The tab 28b carries the contact means 19 on its inner side.

It will be understood that the invention provides a label for the identification of an object and which permits, by the storage capacity of the integrated circuit 12, the storage of a large amount of items of information relating to this object, while it permits, by means of the associated apparatus, putting the unintelligible information of the label in an intelligible form only when this is required. This is particularly adapted for the identification of cattle in which fraud is practically impossible, since only the veterinary services would possess such an apparatus.

Having now described my invention what I claim as new and desire to secure by Letters Patent is:

1. An apparatus for the identification of a large number of objects in combination with a label, said label comprising a support element for carrying information, means for attaching said support element to the object to be identified, the support element having a region of information for receiving intelligible data concerning the object, a region carrying items of information which are not directly intelligible to unauthorized persons, and electronic means in said region carrying unintelligible items of the information, said electronic means being for processing said information and comprising a semi-conductor circuit which permits the storage and the reading of data relating to the object, said apparatus comprising a portable device for communicating with said electronic means for processing the information and a device connected to said portable device for utilizing the information recorded on said labels, said portable communication device comprising a glove having fingers, said semi-conductor circuit comprising contact elements and one of said fingers carrying contact means for application against said contact elements.

2. An apparatus for the identification of a large number of objects in combination with a label, said label comprising a support element for carrying information, means for attaching said support element to the object to be identified, the support element having a region of information for receiving intelligible data concerning the object, a region carrying items of information which are not directly intelligible to unauthorized persons, and electronic means in said region carrying unintelligible items of the information, said electronic means being for processing said information and comprising a semi-conductor circuit which permits the storage and the reading of data relating to the object, said apparatus comprising a portable device for communicating with said electronic means for processing the information and a device connected to said portable device for utilizing the information recorded on said labels, said semi-conductor circuit comprising contact elements and said portable communication device comprising a tongs which has two branches and is capable of pinching an edge portion of said label and carries, at a free end of one of said branches, contact means adapted to be applied against said contact elements of said semi-conductor circuit.

3. An apparatus according to claim 1 or 2, wherein said label comprises a cavity formed in a part of the label in which part said region carrying unintelligible items of the information is disposed, the semi-conductor circuit is disposed in said cavity and comprises contact studs, said contact means comprises a contact unit which has dimensions which are adapted to the dimensions of said cavity and carries, on an exposed side of said unit, contact studs for clamping against said contact studs of the semi-conductor circuit, and a cable is connected to the contact unit for connection of the contact unit to the device of utilization.

* * * * *